US008681647B2

(12) United States Patent  (10) Patent No.: US 8,681,647 B2
Le Goue et al.  (45) Date of Patent: Mar. 25, 2014

(54) METHOD OF DETERMINATION OF TRANSMISSION QUALITY OF A COMMUNICATION LINK BETWEEN A TRANSMITTER AND A RECEIVER AND CORRESPONDING APPARATUS

(75) Inventors: Yvon Le Goue, Cesson Sevigne (FR); Philippe Bouvet, Cesson Sevigne (FR)

(73) Assignee: Thomson Licensing (FR)

( * ) Notice: Subject to any disclaimer, the term of this patent is extended or adjusted under 35 U.S.C. 154(b) by 243 days.

(21) Appl. No.: 13/068,770

(22) Filed: May 19, 2011

(65) Prior Publication Data

US 2011/0286345 A1  Nov. 24, 2011

(30) Foreign Application Priority Data

May 20, 2010  (EP) ..................................... 10305535

(51) Int. Cl.
*G01R 31/08* (2006.01)
(52) U.S. Cl.
USPC ........... 370/252; 370/241; 370/389; 370/468; 370/420; 370/419
(58) Field of Classification Search
USPC .................. 370/252, 241, 389, 468, 420, 419
See application file for complete search history.

(56) References Cited

U.S. PATENT DOCUMENTS

| | | | |
|---|---|---|---|
| 3,934,224 A | | 1/1976 | Dulaney et al. |
| 6,600,759 B1 | | 7/2003 | Wood |
| 6,760,309 B1 * | | 7/2004 | Rochberger et al. .......... 370/235 |
| 6,765,904 B1 * | | 7/2004 | Anandakumar et al. ...... 370/389 |
| 6,792,470 B2 * | | 9/2004 | Hakenberg et al. ........... 709/232 |
| 6,873,600 B1 * | | 3/2005 | Duffield et al. ............... 370/252 |
| 6,965,573 B1 * | | 11/2005 | Mizukoshi ..................... 370/252 |
| 7,031,311 B2 * | | 4/2006 | MeLampy et al. ............ 370/392 |
| 7,075,981 B1 * | | 7/2006 | Clark ............................. 375/224 |
| 7,142,517 B2 * | | 11/2006 | Tseng et al. ................... 370/252 |
| 7,257,087 B2 * | | 8/2007 | Grovenburg ................... 370/248 |
| 7,284,051 B1 * | | 10/2007 | Okano et al. .................. 709/226 |
| 7,295,549 B2 * | | 11/2007 | Pepin et al. .................... 370/352 |
| 7,298,736 B1 * | | 11/2007 | Matthews ...................... 370/356 |
| 7,342,880 B2 * | | 3/2008 | Yanagihara et al. .......... 370/232 |
| 7,366,790 B1 * | | 4/2008 | Rustad et al. .................. 709/235 |
| 7,519,006 B1 * | | 4/2009 | Wing ............................. 370/252 |
| 7,680,063 B2 * | | 3/2010 | Bedekar et al. ............... 370/252 |
| 7,729,268 B2 * | | 6/2010 | Matta et al. .................... 370/252 |
| 7,747,729 B2 * | | 6/2010 | Levy et al. ..................... 709/224 |
| 8,018,850 B2 * | | 9/2011 | van Beek et al. ............. 370/232 |
| 8,165,011 B2 * | | 4/2012 | Ou et al. ........................ 370/216 |

(Continued)

FOREIGN PATENT DOCUMENTS

DE  10064538  7/2002
WO  WO0188763  11/2001

OTHER PUBLICATIONS

EP Search Report dated May 11, 2010.

*Primary Examiner* — Andrew Lai
*Assistant Examiner* — Andrew C Lee
(74) *Attorney, Agent, or Firm* — Jack Schwartz and Associates, PLLC

(57) ABSTRACT

The invention proposes a method and apparatus for determination of transmission quality of a communication link between a transmitter and a receiver. Among others, the invention allows to determine the transmission quality of a communication link between a transmitter and a receiver by a tier device, for example a transmission quality testing or monitoring device.

11 Claims, 7 Drawing Sheets

(56) References Cited

U.S. PATENT DOCUMENTS

Figure 1:
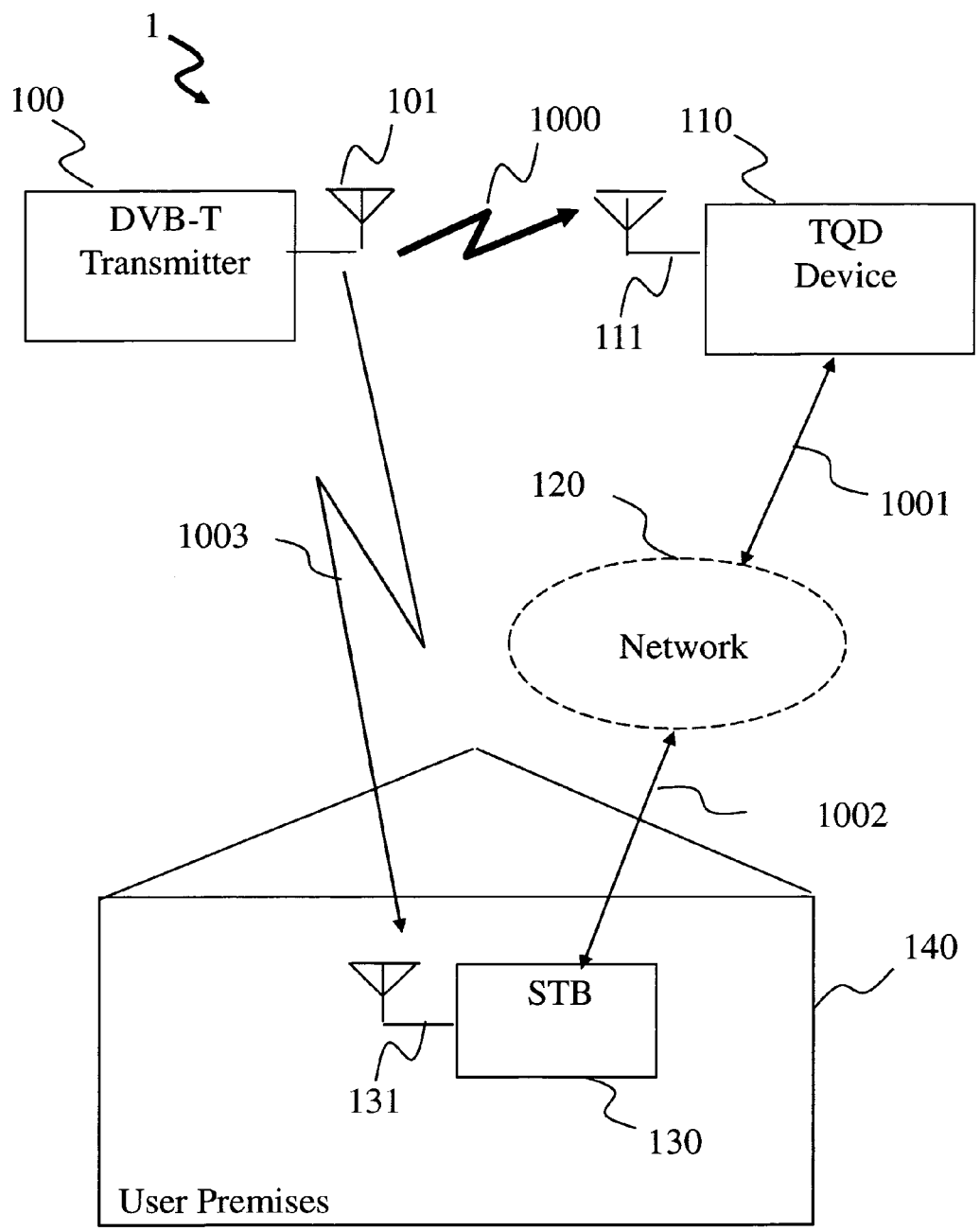

| | | | |
|---|---|---|---|
| 8,274,905 B2* | 9/2012 | Edwards et al. | 370/252 |
| 2002/0141392 A1* | 10/2002 | Tezuka et al. | 370/352 |
| 2003/0048812 A1 | 3/2003 | Gross | |
| 2003/0072269 A1* | 4/2003 | Teruhi et al. | 370/252 |
| 2004/0190459 A1* | 9/2004 | Ueda et al. | 370/252 |
| 2005/0096080 A1* | 5/2005 | Choi et al. | 455/522 |
| 2005/0220028 A1* | 10/2005 | Botkin et al. | 370/241 |
| 2005/0265383 A1* | 12/2005 | Melpignano et al. | 370/465 |
| 2006/0018266 A1* | 1/2006 | Seo | 370/252 |
| 2006/0187927 A1* | 8/2006 | MeLampy et al. | 370/389 |
| 2006/0203737 A1* | 9/2006 | Bugenhagen | 370/252 |
| 2008/0056145 A1* | 3/2008 | Woodworth | 370/252 |
| 2008/0095247 A1* | 4/2008 | Ohno et al. | 375/240.28 |
| 2008/0151885 A1* | 6/2008 | Horn et al. | 370/389 |
| 2008/0186866 A1* | 8/2008 | Morinaga et al. | 370/247 |
| 2008/0298271 A1* | 12/2008 | Morinaga et al. | 370/252 |
| 2009/0086645 A1* | 4/2009 | Hedayat et al. | 370/250 |
| 2009/0109965 A1* | 4/2009 | Matthews | 370/356 |
| 2009/0116397 A1* | 5/2009 | Denby et al. | 370/252 |
| 2009/0135724 A1* | 5/2009 | Zhang et al. | 370/241 |
| 2009/0310574 A1* | 12/2009 | Jeon et al. | 370/336 |
| 2010/0121974 A1* | 5/2010 | Einarsson et al. | 709/231 |
| 2010/0135171 A1* | 6/2010 | Jung et al. | 370/252 |
| 2011/0038270 A1* | 2/2011 | Martin et al. | 370/252 |
| 2011/0182248 A1* | 7/2011 | Fan et al. | 370/329 |
| 2011/0211464 A1* | 9/2011 | Chetlur et al. | 370/252 |

* cited by examiner

METHOD OF DETERMINATION OF TRANSMISSION QUALITY OF A COMMUNICATION LINK BETWEEN A TRANSMITTER AND A RECEIVER AND CORRESPONDING APPARATUS

This application claims the benefit, under 35 U.S.C. §119 of EP Patent Application 10305535.6, filed 20 May 2010.

1. FIELD OF INVENTION

The present invention relates to the field of remote testing of a communication link between a transmitter and a receiver. More particularly, the present invention relates to determination of quality of reception of a digital data stream that is transmitted by a transmitter and received by the receiver via the communication link.

2. TECHNICAL BACKGROUND

US Patent Application 2008/0095325 (Chilton et al, hereinafter "Chilton") describes remote reception of CPE (Customer Premise Equipment) information from a CPE. Network status information is received from a communications network indicative of a current operational status for the network. Then, a recommended customer service center is selected from a plurality of customer service centers based upon at least one of the CPE information and the network status information.

US Patent Application 2005/0220033 (DelRegno et al., hereinafter <<DelRegno>>) describes an apparatus and method for performing automated testing and trouble isolation of a communication link in an access network. According to DelRegno, a control system in the network determines a need for a loopback test, and instructions are transmitted from the control system to a test frame originator. The test frame originator creates a test pattern flow and injects the test pattern in the communication link and prepares to receive looped-back test pattern and analyses the results. If errors are detected, the results are transmitted to the control system. The loopback is established by a device that is closely connected to the device for which the communication link is to be tested, and the test frame originator is located somewhere in the communication link to be tested. According to DelRegno, in order to allow concurrent testing of the communication link and the communication link continuing to carry customer traffic during the test, the tests are made on the OSI (Open Systems Interconnect) layer 2 (data link layer), making it possible to use only a portion of the link bandwidth for the testing.

The prior art solutions for performing testing and trouble isolation of a communication link are not optimized. Chilton for example, receives network status information is received from a communications network indicative of a current operational status for the network, not from the real status of the whole communication link that leads from the transmitter to the receiver. DelRegno only tests part of a communications link that is used for transmission of data to the device to test, i.e. the part of the link that is common with the part of the link that connects the frame originator to the device to test. In addition, DelRegno only tests with a test pattern, which does not correspond to real-life data; it is well known for the skilled in the art that some errors only occur with real-life data. In addition, DelRegno only tests at the data link layer, and errors that only occur at higher layers will thus not be detected. In addition, DelRegno uses for the test frames the communication link that is interconnects the transmitter and the receiver, and the method of DelRegno is thus potentially intrusive.

The current prior art solutions of determination of a quality of a communication link are thus not optimized.

3. SUMMARY OF THE INVENTION

The invention proposes a method and apparatus for remote determination of transmission quality of a communication link between a transmitter and a receiver.

Among others, the invention allows to determine the transmission quality of a communication link between a transmitter and a receiver by a tier device, for example a transmission quality testing or monitoring device. Among the advantages of the method procured by the invention when compared to prior art solutions, are the immediate retransmission of data really received by the receiver. The immediate character of the retransmission procures a real-time aspect to the retransmission, which accelerates analysis of the retransmitted data for analysis and reduces delay between occurrence of errors and intervention for taking the right measures to avoid these errors. The immediate retransmission also avoids the need for storage space for the retransmission packets in the retransmitting device. The retransmission of the data without modifying i.e. 'as received' (which does not exclude adding data such as timestamps, or enveloping the data in other packets order to adapt to a transmission of the data using a different protocol), allows good analysis of the data as it is really received by the retransmitting device, and thus allows to isolate errors that occur on the particular connection of the retransmitting device, such as errors occurring only on the 'last mile' of a communication link, which can be caused by, for example, overcharging a communication link with traffic that exceeds the communication link's maximum bandwidth capacity, and includes detection of reception errors due to faulty connectors or faulty wiring in a user's home for example (including the use of non adapted wiring such as non-shielded cabling, resulting in data loss due to interference with adjacent cabling, or cabling with wrong impedance, resulting in disturbed propagation of signals on a coaxial cable). It also allows to detect errors that occur due to a retransmitting device malfunctioning, such as a defective reception interface or digital reception circuit. As will be explained furtheron, the retransmitted data can be retransmitted on another link than the link over which the retransmitted data is received by the retransmitter, and/or the received data can be retransmitted by using a sampling method, thereby not retransmitting all received data, but only samples, which has an obvious advantage of reducing bandwidth for retransmission. The non-intrusive character of the invention, i.e. the remote determination according to the invention does not influence on the quality of transmission on the communication link of which the transmission quality is to be determined. One of other advantages is the possibility to if errors are detected on a communication link between a transmitter and a receiver, to find the part (s) of the communication link which are causing the errors. Also, the method of the invention is not limited to OSI level 2 and thus allows to determine the transmission quality on OSI level 3 (network layer), which allows to obtain important information on for example a relation of the error rate to a QoS used (Quality of Service). When using the method to determine the transmission quality on OSI level 4 (transport layer), the method allows to detect duplication of packets in the network comprising the communication link, and thus obtain important information on the existence of multiple paths. When using the method to determine the transmission quality of a communication link between a transmitter and a receiver on an OSI level higher than level 4 (session layer: 5, presentation layer: 6, application layer: 7), disparity between transmission qualities of the different application data streams can be detected. All of these advantages and other advantages not mentioned here but that will become clear through the detailed description of the invention that follows make the method advantageously well suited for determination of transmission quality of a communication link between a transmitter and a receiver.

According to the invention, at least some of the packets of a digital data transmission received from a transmitter device by a receiver device via the communication link of which the transmission quality is to be determined, (referred to hereafter as 'communication link') are immediately retransmitted without modification to a transmission quality determination device (hereafter referred to as 'TQD device') that wishes to determine the transmission quality of the communication link. This immediate retransmission takes place over another communication link, hereinafter referred to as 'retransmission link', different from the communication link of which the transmission quality is to be determined. The separation between the communication link and retransmission link allows being completely non-intrusive with regard to the transmission over the communication link, i.e. the test does not influence the result. Due to the immediateness of the retransmission, no storage is necessary in the receiver device for the packets that are retransmitted, which is advantageous when the packets belong to voluminous data, such as audio and/or video data. Another advantage of the immediate retransmission is that analysis by the TQD device is done on on-line, real-time received data, and any results of the analysis by the TQD device are available quickly after transmission of the data to the receiver device and thus intervention to repair a data link or to reroute data on another link is fast. According to different embodiments, the difference of the links is either logical or physical, i.e. the communication link and the retransmission link are implemented as physically different links, for example via different cables, or logically different links, e.g. using a same cable but using different modulation frequencies for the communication link and the retransmission link. According to the invention, retransmitted packets, i.e packets received by the receiver device from the transmitter over the communication link that are retransmitted by the receiver device over the retransmission link are then compared in the TQD device with so-called reference packets, i.e. comprising at least part of the same packets as transmitted by the transmitter over the communication link. According to a variant embodiment of the invention, the retransmitted packets are enveloped in other packets during the immediate retransmission, in order to adapt them to a typical data communication protocol to be used for transmission of data over the retransmission link. From this comparison a transmission quality of the communication link is determined. Therefore, according to a first embodiment, the comparison is done by the same device as the transmitter device, having directly access to the transmitted packets. The TQD device is then integral part of the transmitter. According to a variant embodiment, the comparison is executed by a TQD device distinct from the transmitter device, connected to the transmitter device via a high quality link.

According to a variant embodiment of the invention, the communication link and the retransmission link use different transmission protocols. For example a communication link is a wireless terrestrial broadcast communication link using the DVB-T protocol for terrestrial broadcast transmission, whereas the retransmission link is an Internet Protocol (IP) link over the Internet, using the Internet Protocol for digital data transmission.

In order to determine transmission quality of a communication link between a transmitter and a receiver, the invention proposes a method of determination of a transmission quality of a first communication link between a transmitter and a receiver, the method comprising a step of reception of first data packets and storing of at least part of said first data packets as reference data; a step of reception of second data packets via a second communication link, referred to as retransmission link, the second data packets comprising at least part of the first data packets received by said receiver from said transmitter via the first communication link and immediately retransmitted by the receiver via the retransmission link; an a step of determination of the transmission quality of said first communication link through comparison between the first data packets received and the at least part of said first data packets comprised in the second data packets received.

According to a variant embodiment of the invention, the method comprises a step of associating time stamps to first data packets as they are received, and storing of these time stamps.

According to a variant embodiment of the invention, the determination of the transmission quality of said first communication link comprises a determination step of network jitter through a comparison of a first time difference between said first time stamps associated to subsequent first data packets with a second time difference between second time stamps associated to subsequent second data packets.

According to a variant embodiment of the invention, the determination of said transmission quality of the first communication link comprises a determination step of Bit Error Rate based on a comparison of the first data packets with the second data packets.

According to a variant embodiment of the invention, the determination of the transmission quality of the first communication link comprises a determination step of packet loss based on a comparison of the first data packets with the second data packets.

According to a variant embodiment of the invention, the determination of the transmission quality of the first communication link comprises a step of transmission of configuration commands to the receiver, said configuration commands comprising commands for enabling or disabling retransmission of packets received by the receiver to a device implementing the method as the second data packets.

According to a variant embodiment of the invention, the configuration commands comprise commands indicating for the receiver which packets that the receiver receives are to be immediately retransmitted by the receiver to a device implementing the method as the second data packets.

According to a variant embodiment of the invention, the configuration commands comprise an address identifying the receiver.

The invention also concerns a device for determination of a transmission quality of a first communication link between a transmitter and a receiver, the device comprising a first network interface for reception of first data packets; a memory for storing of at least part of said first data packets as reference data; a second network interface for reception of second data packets via a second communication link, referred to as retransmission link, said second data packets comprising at least part of said first data packets received by said receiver from said transmitter via said first communication link and immediately retransmitted by said receiver via said retransmission link; and a controller for determination of said transmission quality of said first communication link through comparison between said first data packets received and said at least part of said first data packets comprised in said second data packets received.

According to a variant embodiment of the invention, the controller further associates time stamps to first data packets as they are received via said first network interface, and comprises a memory for storing of these time stamps.

According to a variant embodiment of the invention, the determination of said transmission quality of said first communication link comprises a determination by said controller of network jitter by a comparison of time stamp between subsequent first data packets and subsequent second data packets.

4. LIST OF FIGURES

Figure 3:
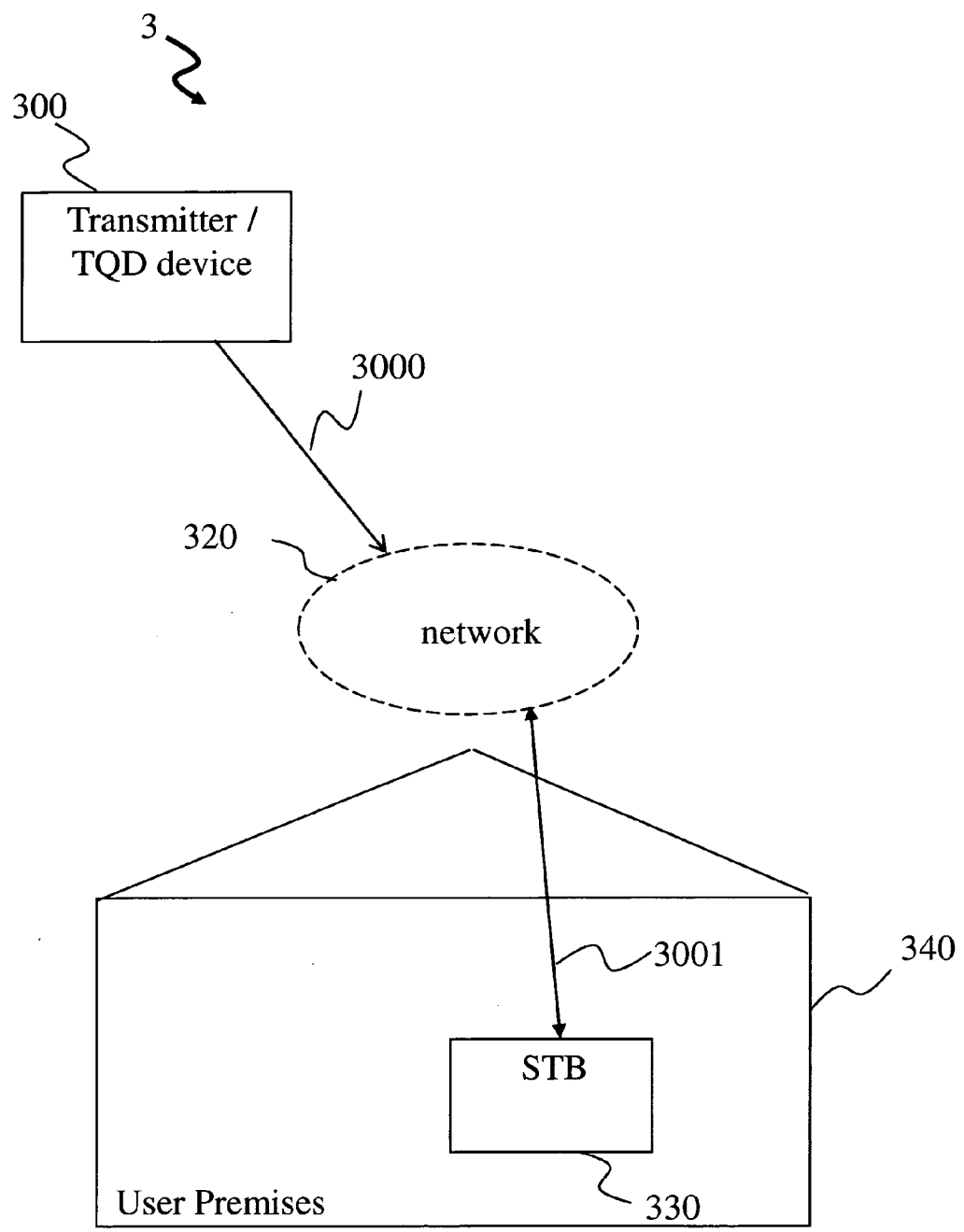
Figure 4:
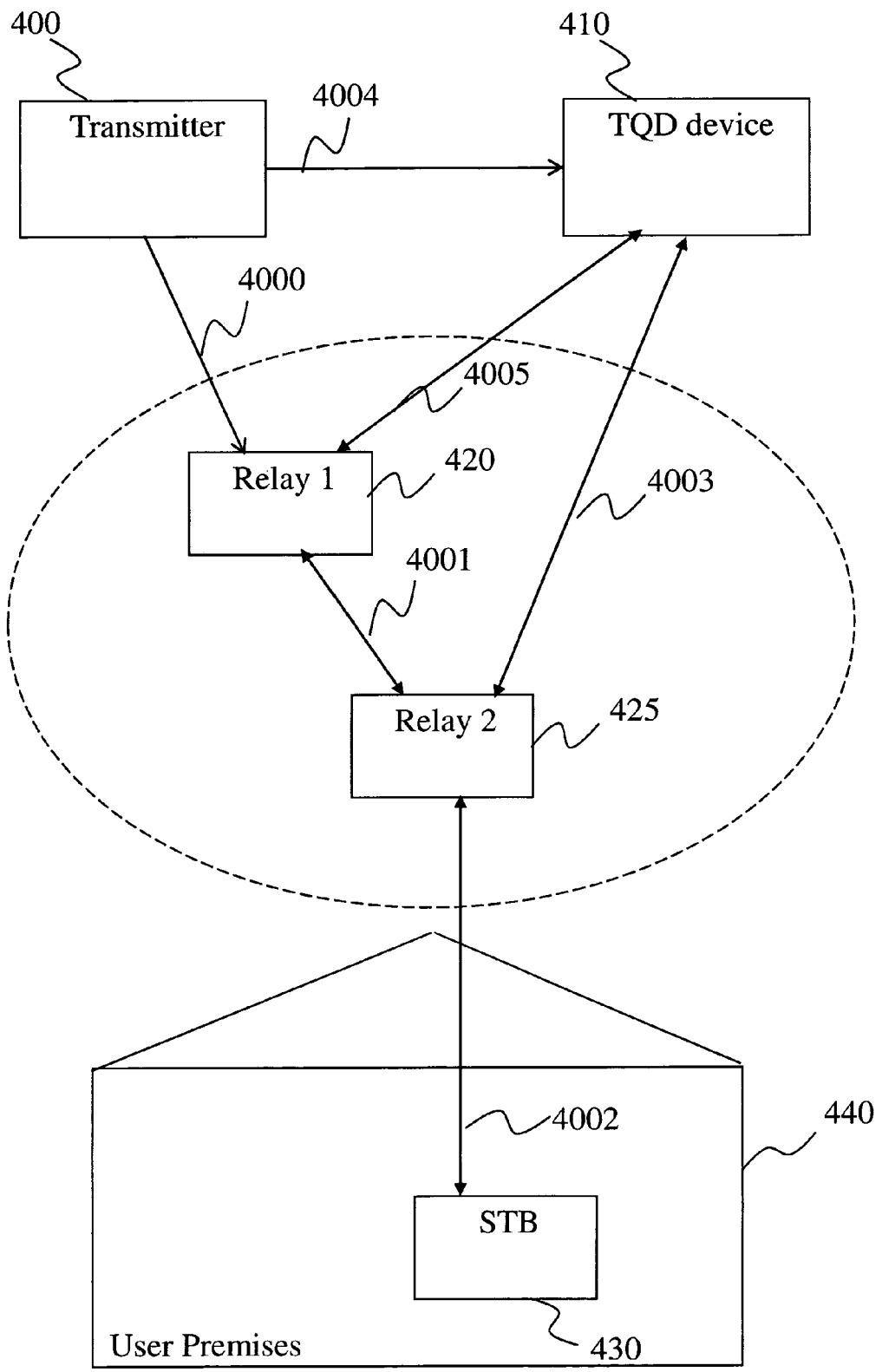
Figure 5:
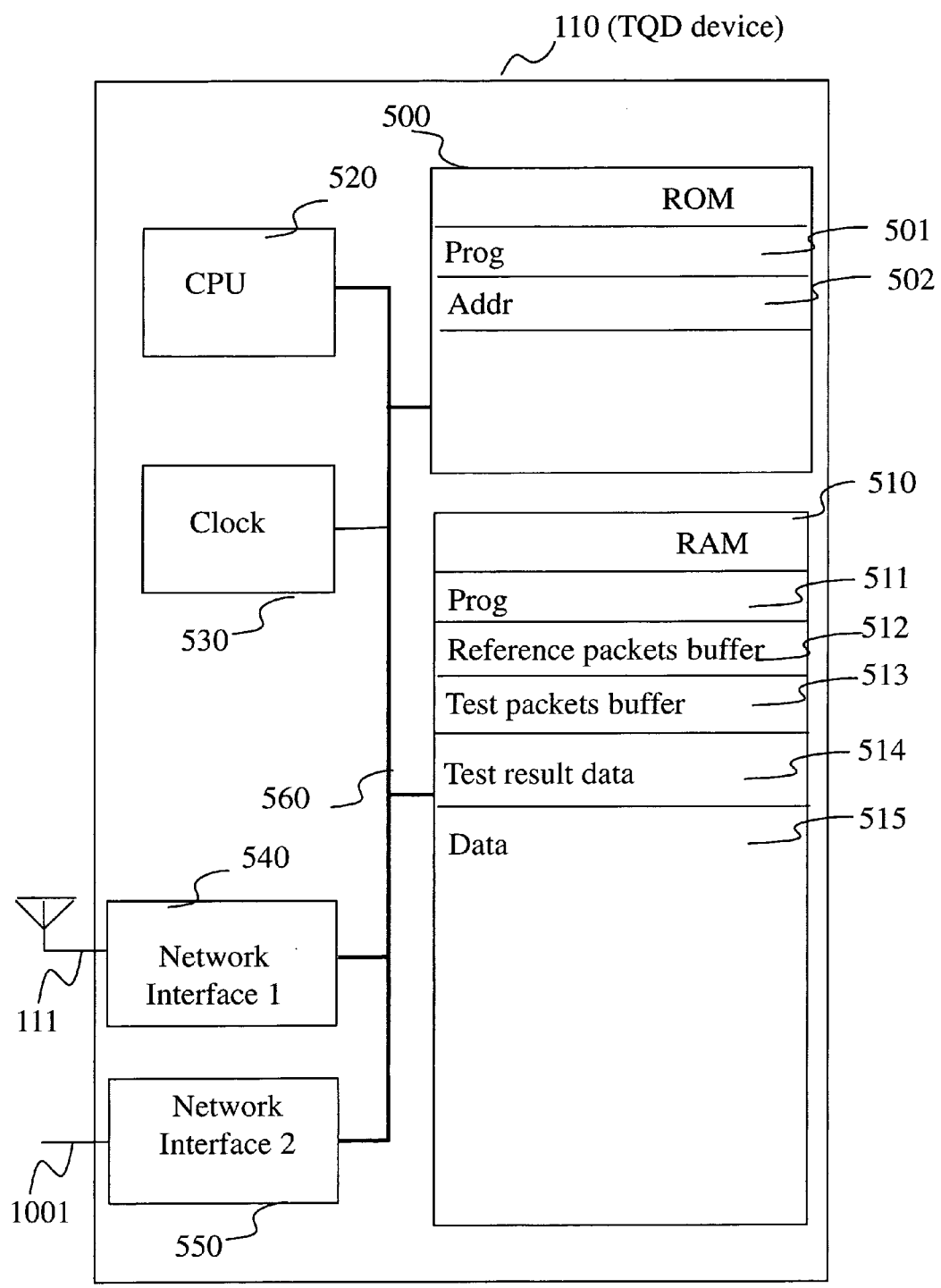
Figure 6:
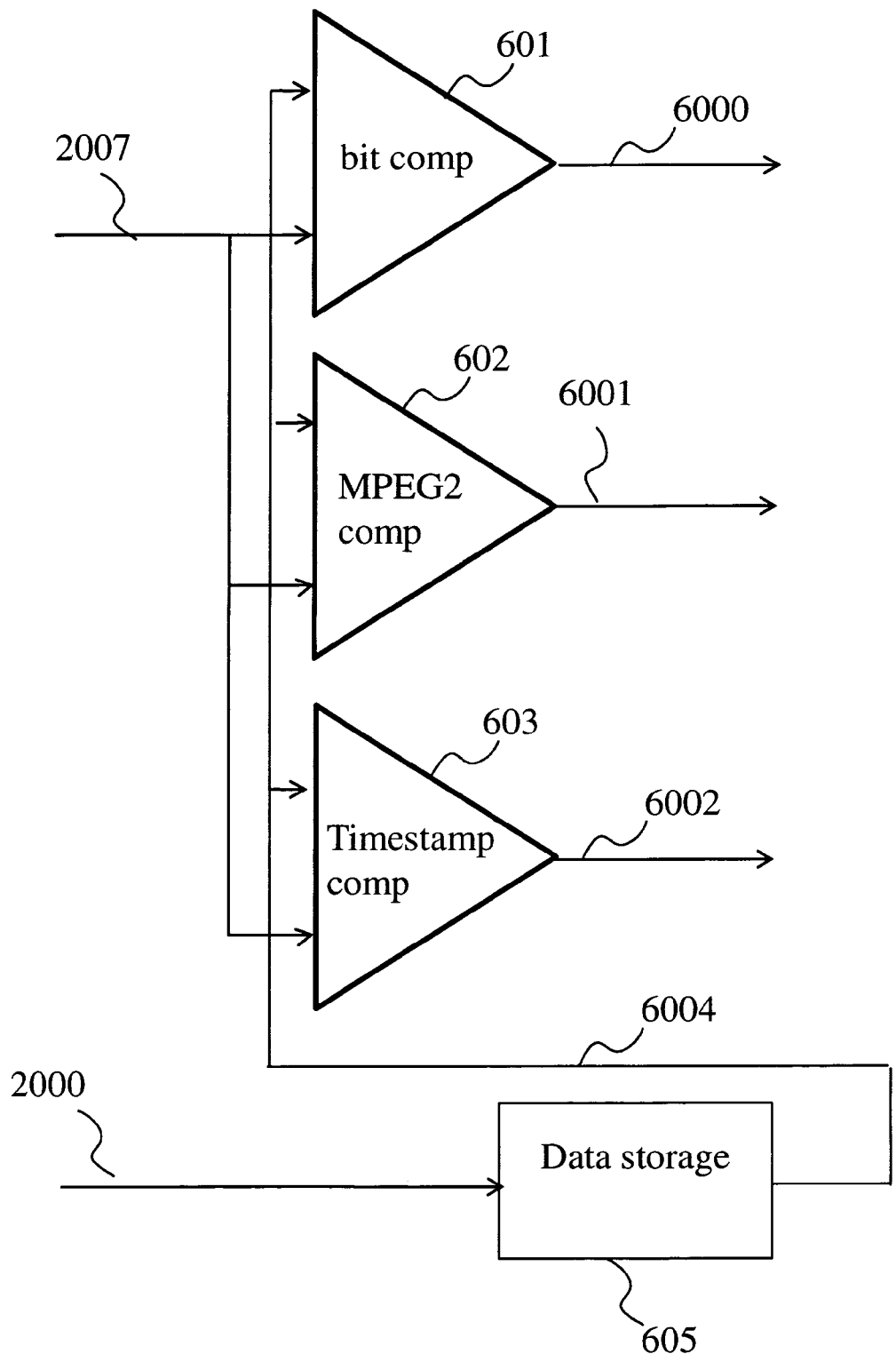
Figure 7:
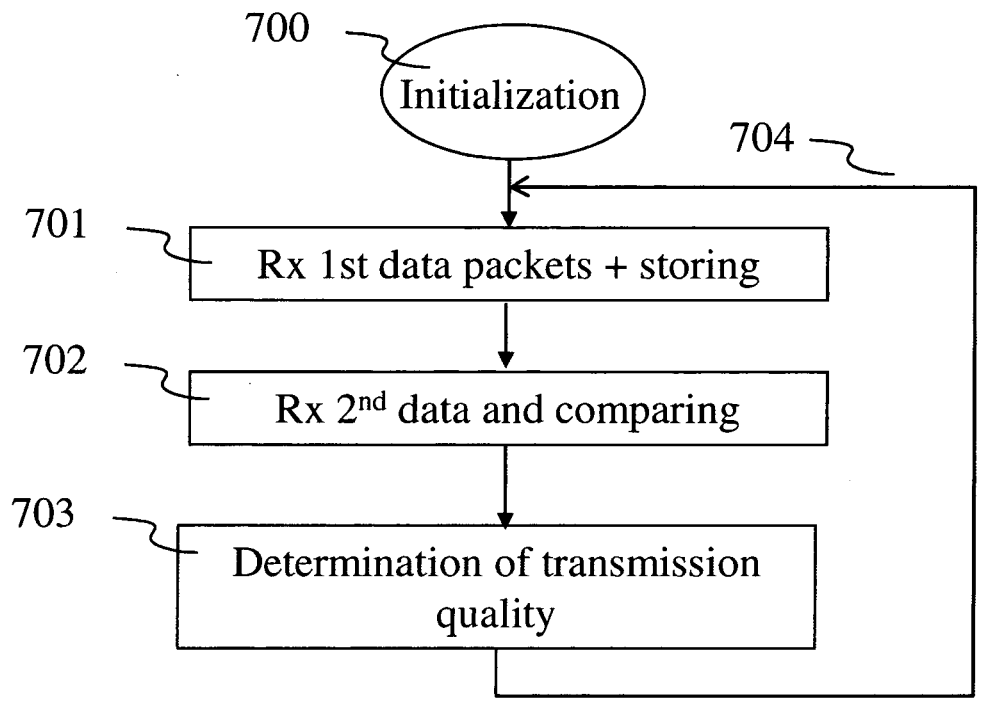

More advantages of the invention will appear through the description of particular, non-restricting embodiments of the invention. The embodiments will be described with reference to the following figures:

FIGS. 1 to 4 illustrate four variant embodiments of the invention according to different data communication network architectures;

FIG. 5 diagrammatically shows a TQD device belonging to the network of FIG. 1, 2, 3 or 4, according to a particular embodiment of the invention;

FIG. 6 diagrammatically illustrates components of a TQD device according to a particular embodiment of the invention;

FIG. 7 diagrammatically illustrate an algorithm of implementation of the invention according to a particular embodiment, implemented for example by the TQD devices of FIGS. 1-4.

5. DETAILED DESCRIPTION OF THE INVENTION

FIG. 1 shows a data communication network 1 implementing the invention according to a particular embodiment.

The data communication network 1 comprises:
a TQD device 110, for example a Personal Computer or a dedicated equipment;
DVB-T transmitter 100;
user premises 140; and
an IP-based communications network 120.

The user premises 140 comprises:
a DVB-T set-top box (STB) 130.

Arrow 1003 represents the communication link between the transmitter 100 and the receiver 130 of which the transmission quality is to be determined by TQD device 110. The packets transmitted by transmitter 100 to STB 130 are also received by TQD device 110, which is indicated by arrow 1000. It is supposed here that due to the quality of the communication link 1000 between the transmitter 100 and TQD device 110, for example due to relative proximity of TQD device 110 and the transmitter 100, the wireless transmission of transmitter device 100 is received without errors by TQD device 110. For the wireless transmission and reception, transmitter 100, TQD device 110 and set-top box 130 are equipped with antennas 101, respectively 111 and 131. STB 130 is further equipped with a wired network interface, allowing it to transmit and receive data to/from IP network 120 via connection 1002. TQD device 110 is also equipped with such an interface for the same purpose, allowing it to transmit and receive data to/from IP network 120 via connection 1001.

TQD device 110 receives the data packets that transmitter 100 transmits and stores at least part of the received data packets as reference data. Set-top box 130 also receives the same packets transmitted by transmitter 100 and immediately retransmits at least part of these packets on IP link 1002 to network 120 without modification. Network 120 in turn forwards the packets to TQD device 110. Then TQD device compares the reference packets with the retransmitted packets and determines there from a transmission quality of the communication link between the transmitter and the set-top box 130. According to a variant embodiment, TQD device 110 stores the data packets that it receives from transmitter 100 (=reference data) together with time stamps indicating time of reception, in order to allow detection of jitter in retransmitted packets received from device 130 through comparing differences between arrival time of subsequent packets of reference data with differences between arrival time of subsequent packets of retransmitted data. The arrival times of packets are determined based on time stamps that are associated to each of the subsequent packets (retransmitted and reference packets). A difference between arrival time (time stamp) between subsequent packets of retransmitted packets (delta-t-retransmitted) and arrival time (time stamp) between subsequent packets of retransmitted packets (delta-t-reference) means that network jitter has occurred, i.e. delta-t-retransmitted minus delta-t-reference is not equal to zero. The arrival time of retransmitted packets is the arrival time as observed by the retransmitter. The arrival time of reference packets is the arrival time as observed by the TQD device.

The 'raw' immediate retransmission of at least part of the packets received ('retransmitted' packets), i.e. as they are received by set-top box 130 (even though they may be enveloped in other packets to adapt to a transmission protocol used on the retransmission link) and the packets as they are transmitted by transmitter 100 ('reference' packets) gives the TQD device 110 precious information on the transmission quality of the communication link 1003. It can help finding the cause of a receiver device malfunctioning that is otherwise difficult to resolve without on-site intervention of a service engineer. For example, when set-top box 130 does not receive all of the packets transmitted by transmitter 100, and/or receives packets with errors, and/or receives packets out-of sequence, STB 130 may very well be capable of coping with such errors if it has means to correct them, for example by using FEC (Forward Error Correction) data. But when the errors become too important to be corrected by the error correction code, the 'hidden' errors become suddenly visible for the user of the set-top box. The determination of the transmission quality according to the invention can then help preventing this case to arrive by determining the transmission quality of the communication link and if transmission quality is determined to be approaching the power of correction of the error correction code, to take preventive measures, for example reinforce the error correction code, change the QoS (Quality of Service) class of the transmission or change the bit rate of the transmission, configuring the set top box to choose only streams which have lower bit rate, transmit a new service list to the receiver with lower-bit rate services, etc. The determination of the transmission quality of the communication link can thus serve to optimize services distribution provided to the receiver via the communication link and to optimize the quality of the services offered to a user. The previous example showed that measures are taken when it is determined that transmission quality is insufficient or nearly insufficient. On the other hand, it may also happen that a transmission quality is determined to be largely sufficient, allowing for example the transmission of HDTV services, rather than SDTV services. This can happen for example if recent work on the communication link copper parts of the communication link have been replaced by optical fiber or particular network equipment in the communication link from the transmitter to the receiver is replaced by better performing equipment.

Because of its non-intrusive determination of transmission quality of a communication link, it is possible to use the invention in fully operational environments. This has many advantages, such as allowing regular determination of transmission quality of communication links without perturbing receptions of transmissions, for statistical surveillance or error surveillance. An operator may thus very well use the invention to monitor specific communication links for users that have reported intermittent device malfunctioning.

The determination of the transmission quality according to the invention makes it not only possible to detect errors, but also to determine that a communication link is of a certain quality that allows certain types of transmissions for example high-definition television (HDTV) to be transmitted, or on the contrary, that does not allow HDTV transmissions, but that supports very well the transmission of SDTV services (standard definition television). The invention thus allows an operator to adapt the service offer to the quality of the communication link used for the transmission. In a more refined manner, the invention allows an operator to choose the error correction method that is best adapted to the quality of the communication link; for example, it allows him to choose the right power of correction of associated FEC (Forward Error Correction). According to a variant embodiment of the invention, the determination of transmission quality can serve the receiver, such as STB 130 of FIG. 1, to choose only the programs that it can receive with sufficient quality, for example SDTV programs. In this case, the transmission quality, previously determined by the TQD device implementing the method of the invention, is communicated to the STB so that it can take its decision to choose HDTV or SDTV programs itself. According to yet another variant, the STB is remotely configured based on the transmission quality determination done by the TQD device to connect only to SDTV programs. According to yet another variant, the list of programs that the receiver can receive is adapted to the transmission quality determined. According to yet another variant, the determination of the transmission quality is used to change the transmission protocol used by the transmitter, so that a transmission protocol is chosen that is best adapted to the determined transmission quality; for example the RTP protocol may be chosen for its ability to enable correction in the receiver of a certain amount of jitter (thanks to the RTP time stamps feature) and of reordering of packets received out-of sequence (thanks to the RTP sequence numbering feature).

According to the embodiment of FIG. 1, the communication link 1003 of which the transmission quality is to be determined is of the DVB-T type, transmitting MPEG2TS type packets (Motion Picture Expert Group Transport Stream according to MPEG2). The retransmission link 1002-1001 is of the IP type. Therefore, the set-top box 130 immediately retransmits at least part of received MPEG2TS packets as payload in IP packets.

According to a variant embodiment, the set-top box 130 uses the RTP protocol to transmit the MPEG2TS packets. Typically, the RTP packet can contain seven MPEG2TS packets of a length of 188 bytes. According to this embodiment, the RTP packet header comprises a timestamp that gives the time of reception by the set-top box 130 of the packets in the RTP payload, indicating the time of reception for all or only some of the packets in the payload, for example the reception time of the first packet, or of the last packet in the payload. This variant allows among others the TQD device to determine the jitter that occurs on the communication link for which the transmission quality is to be determined, then the TQD device 110 compares time stamps that it has stored together with the reference data received from device 100 with the time stamps included in the RTP header. For this purpose, the time difference between subsequent time-stamped packets of reference data is compared with the time difference between subsequent time-stamped retransmitted data.

The RTP headers enable adding of information to the packets received from transmitter 100. Sending at least some of the packets received from transmitter 100 as retransmitted packets enveloped in RTP packets to the TQD device 110 also allows the TQD device to determine if the packets that were received by the receiver device comprise out-of sequence errors, thanks to the sequence numbering feature of RTP. In cases where an external signal perturbs the transmission on the communication link, for example due to crosstalk, the timestamps may also be of help to determine the character of the signal (the relation between perturbation and time becomes visible with help of the timestamps), and may help in tracking of the cause of the perturbation.

According to a variant embodiment of the invention, not all packets as received by set-top box 130 are immediately transmitted, but only some are immediately retransmitted while others are not retransmitted at all. This allows reducing the bandwidth taken for the immediate retransmission via the retransmission link. This variant is advantageous among others when the maximum sustained bit rate of the retransmission link 1002-1001 is lower than the bit rate of the packets received over the communication link 1003 by the receiver 130, which is for example the case for IP uplinks. According to this variant, only packets belonging to one stream component of an MPEG2TS audio/video stream are transmitted; and/or packets are picked from the transmission received by the receiver 130 on a regular interval and then immediately retransmitted, i.e. through a sampling method. According to a further optimization of this embodiment, the receiver 130 is remotely configurable so that the PID of a stream component for which packets are to be retransmitted can be set, and/or so that the sampling rate i.e. the interval with which packets are to be picked and are to be immediately retransmitted can be set. According to a variant embodiment, the receiver STB 130 determines itself the sampling rate as a function of the bandwidth available on the retransmission link, and indicates the sampling rate in for example a header of the retransmitted packets so that the TQD device has knowledge of the sampling period and does not wrongly interpret packets that are missing (i.e. packets from in between the sampling moments) as lost packets.

According to yet another variant embodiment, the previous embodiments are combined, thereby allowing to reduce the bandwidth taken on the communication link, and to add precious information on when the packets were received through the timestamps added to the RTP header.

According to a variant embodiment, the immediate retransmission according to the described embodiments is a configurable feature of the receiver, in the embodiment of FIG. 1 STB 130, that is enabled and disabled using configuration commands such as according to the SNMP (Simple Network Management Protocol), or, according to another variant embodiment, the TR-069 (Technical Report 069) CWMP (Customer premises equipment Wide area network Management Protocol). These protocols allow the invention to be implemented by different manufacturers, and the variant is interesting for service operators, as it makes the invention manufacturer independent.

Figure 2:
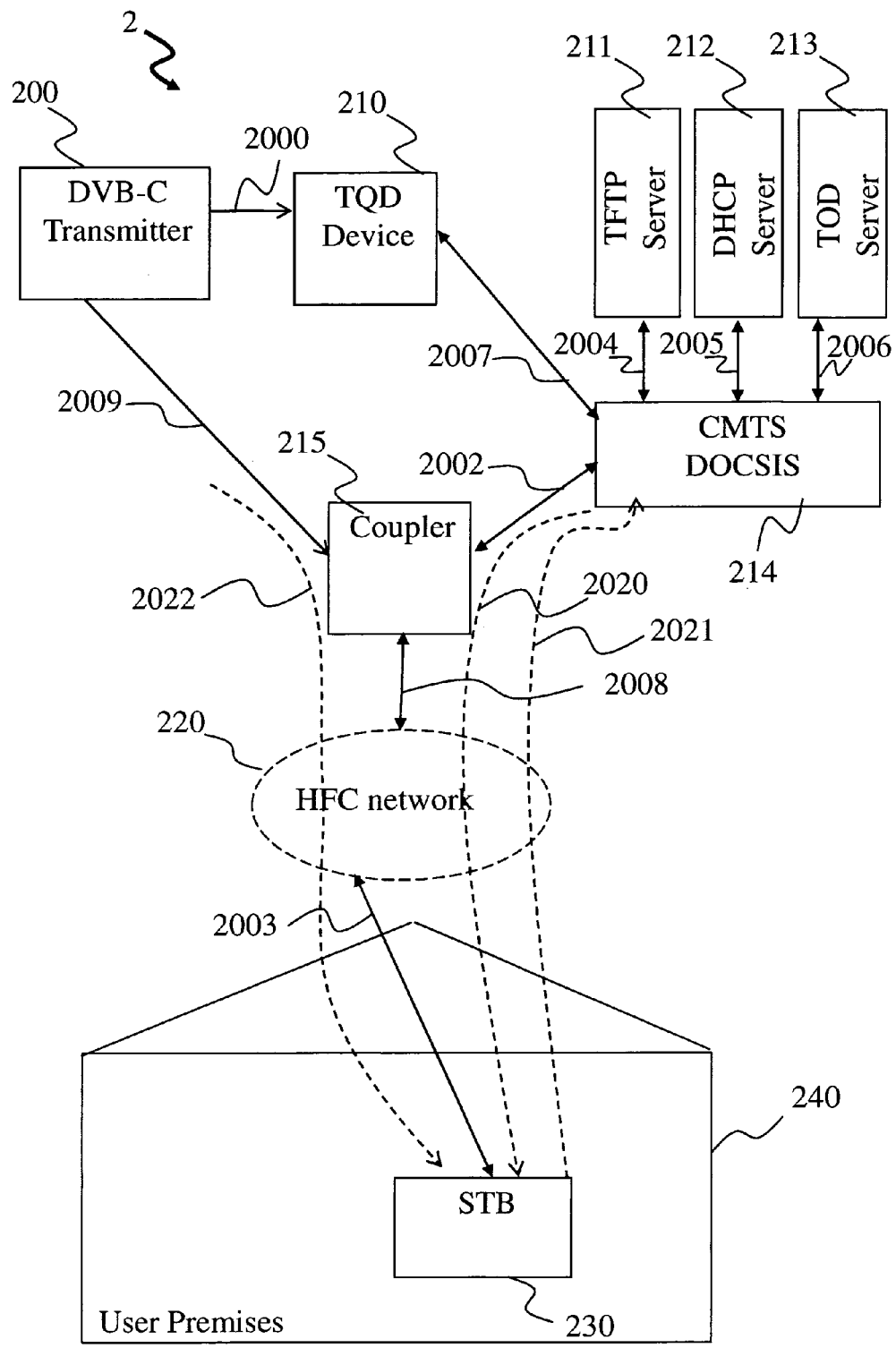

FIG. 2 shows a variant embodiment of the invention. Here, the invention is implemented in an environment employing a HFC (Hybrid Fiber Coax) cable network. DVB-C (Digital Video Broadcasting-Cable) transmitter device 200 transmits MPEG2TS (Motion Picture Expert Group 2—Transport Stream) packets over connection 2000 to TQD device 210, of which at least part are stored by TQD device 210 as reference packets. The packets of transmitter device 200 are also transmitted via coupler 215 over HFC cable network 220 to cable set-top box 230 via connections 2009, 2008 and 2003. The set-top box 230 immediately retransmits at least some of the packets received from DVB-C transmitter 200 via cable network 220 to TQD device 210 via connections 2003, 2008, 2002 and 2007, traversing network 220 and DOCSIS (Data Over Cable Service Interface Specification) CMTS (Cable Modem Termination System) 214. A CMTS enables communication with subscriber's cable modems, such as a cable modem (not shown) integrated in STB 230. The CMTS, allows STB 230 among others to acquire an IP address from DHCP server 212. The CMTS also serves for allocating transmission frequencies for data communications over the HFC. The principle of the invention is the same as for FIG. 1. However, instead of using physically different links and different transmission protocols, the variant of FIG. 2 uses the same physical link 2003 and the same protocol, i.e. cable transmission, e.g. via a Docsis standard (Data Over Cable Service Interface Specification). Non-intrusiveness of the quality determination of the communication link 2009-2008-2003 is here obtained by separation of the communication channels used for the transmission and the retransmission. Here, for the data transmission (2022) from transmission device 200 to set-top box 230 (downstream IP packets in an MPEG Transport Stream), a first carrier frequency is used (f1, dotted arrow 2022). For the data retransmission from set-top box 230 to test device 210 (upstream Ethernet frames, comprising at least some of the MPEG Transport Stream packets received by STB 230, encapsulated according to a transmission protocol used on link 2003, for example UDP, TCP, or RTP on top of UDP, or RTP on top of TCP), a different carrier frequency is used (f3, dotted arrow 2021). Configuration commands to initiate the immediate retransmission by STB 230 are transmitted by TQD device 210 to STB 230 over a second frequency (f2, dotted arrow 2020). The role of the TOD server 213, that is connected to the DOCSIS CMTS 214 via connection 2006, is to provide time to all cable modems on the network according to the DOCSIS standard, such as to cable modem (not shown) integrated in STB 230. The role of the TFTP server 211 that is connected to DOCSIS CMTS 214 via connection 2004 is to provide configuration files to all cable modems in the network and to provide software upgrade images for the cable modems, according to the DOCSIS standard, such as to cable modem (not shown) integrated in STB 230.

FIG. 3 shows yet another variant embodiment of the invention. Here, the transmitter device and the TQD device are integrated in one and the same device 300. Separation of the communication- and retransmission links is obtained as described for FIG. 2. The advantage of integration of the TQD device and the transmitter device is that the TQD device is ensured of errorless and delay less reception reference packets.

FIG. 4 shows a variant embodiment of the invention that illustrates the possibility to isolate different parts of the communication link of which the transmission quality is to be determined. For example, if errors are detected by the method of the invention in the packets retransmitted by set-top box 430, the invention makes it possible to isolate specific parts of the communication link, e.g. by starting from the leaf device N in the communication link and by successively disabling the packet retransmission by device N and enabling the retransmission by device N-n, where n can take values from N−1 to 1 (1 being the transmitter). The enabling and disabling of the retransmission is for example done using the previously described protocols for remote device configuration (e.g. SNMP, TR-069, proprietary protocol).

In particular, according to the variant embodiment of FIG. 4, if TQD device 410 observes a bad transmission quality for communication link 4000-4001-4002 based on a comparison of the retransmitted packets coming from STB 430 and packets directly received via link 4004, the immediate retransmission by set-top box 430 is disabled and immediate retransmission by relay 425 is enabled by transmission of configuration commands to STB 430 (retransmission: off), respectively relay 425 (retransmission: on). If good transmission quality is determined, the transmission errors are caused by link 4002. If determined transmission quality is still bad, the immediate retransmission by relay 425 is disabled, and immediate retransmission is enabled for relay 420 via link 4005, and so on, until the defective part of the communication link is identified. According to a particular embodiment, the relays are cable- and/or IP routers, or wireless transmitters/receivers stations. The previous is also applicable to for example FIG. 2, if coupler 215 implements the invention, it can be configured to retransmit packets received from transmitter 200 instead of STB 230 doing the retransmission, so that it can be determined with help of the method according to the invention which part of the communication link between transmitter 200 and STB 230 is not functioning properly, i.e. 2009 or 2008 or 2003, or any combination of at least two of these links.

FIG. 5 diagrammatically shows a device according to a particular embodiment of the invention. The device is for example TQD device 110 of FIG. 1. The device 110 comprises, connected to each other by an address- and data bus 560:

- a processing unit 520 (or CPU for Central Processing Unit);
- a non-volatile memory of type ROM (Read Only Memory) 500;
- a volatile memory of type RAM (Random Access Memory) 510;
- a clock 530, providing a reference clock signal for synchronization of operations between the components of the TQD device 110 and for timing purposes (for example to generate time stamps);
- a wireless network interface 540, allowing the reception of first data from DVB-T transmitter 100; and
- a wired network interface 550, allowing notably the retransmission of at least part of the packets received via interface 540 to TQD device 110, and allowing to receive configuration commands.

It is noted that the word "register" used in the description of memories 500 and 510 designates in each of the mentioned memories, a low-capacity memory zone capable of storing some binary data, as well as a high-capacity memory zone, capable of storing an executable program, or a whole data set, such as a complete web interface, or a complete list of modules.

Processing unit 520 can be implemented as a microprocessor, a custom chip, a dedicated (micro-) controller, and so on. ROM memory 500 can be implemented in any form of non-volatile memory, such as a hard disk, non-volatile random-access memory, EPROM (Erasable Programmable ROM), and so on.

The ROM memory 500 comprises notably a register 501 that holds a program representing an executable program comprising the method of determination of a transmission quality of a communication link between a transmitter and a receiver. The ROM memory 500 further comprises a list of addresses of remote configurable devices, such as those of set-top box 130, in register 502. When powered up, the microprocessor 520 loads the instructions comprised in ROM register 501, copies them to RAM register 510, and executes them.

The RAM memory 510 comprises notably:
- a register 511 comprising a copy of the program 'prog' of ROM register 501;
- a register 512 comprising a buffer or memory zone reserved for reception of reference packets, i.e. first packets received via network interface 540 that are compared against second packets;
- a register 513 comprising second packets received via network interface 550 from a device from which a transmission quality is to be determined, such as set-top box 130;
- a test result data buffer 514 for storing results of the determination of transmission quality; and
- a data register 515 comprising temporary data and variables needed during the execution of the program 'prog' comprised in register 511.

Other device architectures than illustrated by FIG. 5 are possible and compatible with the method for determination of a transmission quality of a communication link between a transmitter and a receiver. Notably, according to variant embodiments, the invention is implemented as a pure hardware implementation, for example in the form of a dedicated component (for example in an ASIC, FPGA or VLSI, respectively meaning Application Specific Integrated Circuit, Field-Programmable Gate Array and Very Large Scale Integration), or in the form of multiple electronic components integrated in a device or in the form of a mix of hardware and software components, for example a dedicated electronic card in a personal computer.

FIG. 6 shows components part of a TQD device implementing the invention according to a particular variant embodiment TQD device such as device 210 of FIG. 2. Not all components that a TQD device possibly comprises for complete functioning are shown here for reasons of clarity of representation. Not shown components include for example a clock for time-stamping of received packets and network interfaces to receive reference data packets and retransmitted packets, a command unit to transmit configuration commands to set top box 230 in order to initiate the packet retransmission, and an interface to transmit or represent the results of the testing done.

Reference data packets 2000 are received and stored in data storage 605, time-stamped with the help of an internal clock (not shown). Stored reference packets are then provided to three comparators, one comparator 601 for BER detection (Bit Error Rate), a second comparator 602 for MPEG2 packet error detection, and a third comparator 603 for detection of network jitter.

Comparator 601 determines bit error rate based on a number of bits in the retransmitted packets 2007 that have been altered with regard to reference packets stored in storage 605, for example due to noise, interference or distortion.

Comparator 602 detects MPEG2 packet errors such as header or payload errors, when comparing immediately retransmitted MPEG2 packets received via 2007 with stored MPEG2 packets from storage 605. With such a comparator, it is possible for example to detect MPEG2 packet loss.

Comparator 603 detects network jitter by comparing arrival time between subsequent packets of retransmitted packets 2007 with arrival time between subsequent packets of reference packets 2000 stored in storage 605. The arrival times of packets are determined based on time stamps that are associated to each of the subsequent packets (retransmitted and reference packets). A difference between arrival time (time stamp) between subsequent packets of retransmitted packets 2007 (delta-t-retransmitted) and arrival time (time stamp) between subsequent packets of retransmitted packets (delta-t-reference) means that network jitter has occurred, i.e. delta-t-retransmitted minus delta-t-reference is not equal to zero. The arrival time of retransmitted packets is the arrival time as observed by the retransmitter. The arrival time of reference packets is the arrival time as observed by the TQD device.

According to a variant embodiment of the invention applied to the Internet Protocol, comparators in the TQD device comprise Internet Protocol BER comparators, that determine BER for example per service (based on a specific IP address and port number on which the service is transmitted); TCP/RTP comparators, that compare sequence numbers comprised in TCP/RTP headers of retransmitted packets and determine the existence of multiple path (the existence of multiple paths is proven when multiple packets are received with same sequence numbers; when multiple paths are found, an operator can be warned to suppress the multiple path); MPEG2TS comparators that extract specific data from retransmitted packets 2007 determine BER and/or packet loss related to a specific packets, such as SI (Service Information) packets, PSI (Program Service Information) packets, PID (Packet Identifier) packets. This can give important information on the communication link to test, for example audio packets (characterized by a specific PID) are transferred without error but video packets (characterized by another specific PID) are transferred with errors, possibly indicating a bandwidth problem on the tested communication link because video packets are transmitted with higher bit rate than audio packets.

According to a variant embodiment of the invention, the output of all comparators is used to establish a value for quality of service of the tested communication link, making general comparison between communication link quality of service possible between distinct communication links. As an example, given the variant embodiment illustrated in FIG. 4, it can easily and quickly be determined, based on general QoS values, which part of the communication link is not functioning properly (4002, 4001, 4000, or any combination of at least two of these).

According to a variant embodiment, quality of service is determined per comparator, making detailed comparison and analysis possible, resulting in a detailed view of the type of errors that occur on a tested communication link. Then, detailed measures are also possible, as for example increasing the bandwidth of the tested communication link when high-bit rate video PID packets have low quality of service, or adding additional FEC redundancy.

FIG. 7 shows an algorithm for determination of a transmission quality according to the invention, implemented for example by TQD device 110, 210, 300 respectively 410 of respectively FIGS. 1, 2, 3 and 4.

The method begins with an initialization phase 700 during which the different variables and parameters needed for the functioning of the device 110, 210, 300 respectively 410 are updated, for example, the copying of the program 'prog' from ROM register 501 to RAM register 511, and the initialization of data and variables in RAM register 515 of TQD device 110.

Then, during a step 701, the device 110, 210, 300 respectively 410 receives first data packets from for example device 100, 200, 300 respectively 400 and stores at least part of these packets as reference data for example in reference buffer 512 of TQD device 110.

During a step 702, the device 110, 210, 300 respectively 410 receives second data packets from for example set-top box 130, 230, 330, respectively 430 or coupler 215, relay 420 or relay 425 and optionally stores at least part of these packets as test packets data for example in reference buffer 513 of TQD device 110.

In a step 703, the device 110, 210, 300 respectively 410 determines transmission quality of at least part of the communication link 1003, 2009-2008-2003, 3000-3001, 4000-4002, via which set-top box 130, 230, 330, respectively 430 receives packets that it retransmits as second packets to device 110, 210, 300 respectively 410.

Then step 701 is iterated, illustrated by arrow 704.

Naturally, the invention is not limited to the embodiments previously described.

In particular, the invention is not limited to the data communication network architectures as described in respect of FIGS. 1, 2, 3 and 4 but concerns any architecture implementing a communication link interconnecting at least one transmitter to a receiver device and a device capable of determining the transmission quality of the communication link between the at least one transmitter and the receiver device.

In particular, the device 110, 210, 300, respectively 410 (TQD device) and device 130, 230, 330, respectively 430 (device for which the transmission quality of the communication link is to be determined) may be implemented as a dedicated device, or as general hardware equipment, such as a Personal Computer, running software application programs that allows it to implement the functions as described.

In particular, user premises 140, 240, 340 respectively 440 comprise more or less equipment than previously described.

According to the illustrated embodiments, the device for which the transmission quality of the communication link is to be determined is depicted as a set-top box (FIGS. 1-4: 130 of FIG. 1, 230 of FIG. 2, 330 of FIG. 3, 430 of FIG. 4) or a relay, router or coupler (FIGS. 2, 4: 420, 425 or 215). Naturally, the method for determination of a transmission quality according to the invention is not restricted to set-top boxes, relays, routers or couplers, but can be implemented in any type device, such as a Personal Computer, gateway, mobile devices such as hand-held telephones, modem devices, etc.

The method for determination of a transmission quality of a communication link between a transmitter and a receiver may use remote-configurable receivers, using protocols for configuration, control, diagnostics and usage statistics retrieval, for example through the SNMP (Simple Network Management Protocol) protocol or the CWMP (Consumer Premises Equipment—Wide Area Network Management Protocol) protocol and its extensions, or any other standardized or proprietary messages exchange protocol.

Using SNMP, the invention can be implemented by having an SNMP manager in the TQD device and an SNMP agent in the receiver device for which the transmission quality of a communication link linking it to a transmitter is to be determined and by adding a MIB (Management Information) with a specific attribute for the management of enabling and disabling of packet retransmission to the receiver device. For this embodiment, MIB attributes can be added on the level of the receiver device for example with the name <<setRetransmission>> of an enumerated type, allowing the values described hereunder, accessible in read and write mode:

RETRANSMISSION_ON (enumerator value: 1);
RETRANSMISSION_OFF (enumerator value: 0);

The value RETRANSMISSION_OFF means that no retransmission is done of packets received via a determined communication link. The value RETRANSMISSION_ON means that retransmission is done of packets received via a determined communication link.

As previously mentioned, the invention can also be implemented with the use of the CWMP protocol. This protocol is defined in the TR-069 (short for Technical Report 069) specification entitled CPE WAN Management Protocol (CWMP).

The TR-069 specification defines an application layer protocol for remote management of end-user devices. As a bidirectional SOAP/HTTP based protocol it provides the communication between CPE and Auto Configuration Servers (ACS). It includes both a safe auto configuration of CPE devices and the control of other CPE management functions within an integrated framework. TR-069 is the current standard for remote configuration of devices in the range of DSL broadband market. According to a particular embodiment based on the TR-069 standard, the invention is implemented by adding an ACS (Auto Configuration Server) on the level of the TQD device. In the receiver device of which the transmission quality of the communication link linking it to a transmitter is to be determined, a CWMP client is added as well as an object comprising the specific attributes for the management of the enabling/disabling, and for example configuration of sample period of the retransmission feature.

The invention claimed is:

1. A method of non-intrusive determination of a transmission quality of a first communication link between a transmitter device and a receiver device, said method being implemented by a transmission quality monitoring device, wherein said method comprises the following steps:
    reception, by said transmission quality monitoring device, from said transmitter device, of first data packets and storing of at least part of said first data packets as reference data packets;
    reception, by said transmission quality monitoring device, of retransmitted packets, said retransmitted packets being at least part of said first data packets that are transmitted from said transmitter device to said receiver device via said first communication link, received by said receiver device, and retransmitted by said receiver device to said transmission quality monitoring device via a second communication link, said second communication link being different from said first communication link of which transmission quality is to be determined;
    determination, by said transmission quality monitoring device, of said transmission quality of said first communication link between said transmitter device and said receiver device through comparison between said reference data packets and said retransmitted packets.

2. The method according to claim 1, wherein said method comprises a step of associating first time stamps to said first data packets are said first data packets are received by said transmission quality monitoring device, and storing of said first time stamps by said transmission quality monitoring device.

3. The method according to claim 2, wherein said determination of said transmission quality of said first communication link comprises a determination step of network jitter through a comparison of a first time difference between said first time stamps associated to subsequent said first data packets with a second time difference between second time stamps associated to subsequent said second data packets.

4. The method according to claim 1, wherein said determination of said transmission quality of said first communication link comprises a determination step of Bit Error Rate based on a comparison of said first data packets with said second data packets.

5. The method according to claim 1, wherein said determination of said transmission quality of said first communication link comprises a determination step of packet loss based on a comparison of said first data packets with said second data packets.

6. The method according to claim 1, wherein said determination of said transmission quality of said first communication link comprises a step of transmission of configuration commands to said receiver, said configuration commands comprising commands for enabling or disabling retransmission of packets received by said receiver to a device implementing the method as said second data packets.

7. The method according to claim 6, wherein said configuration commands comprise commands indicating for said receiver which packets that said receiver receives are to be retransmitted by said receiver to said device implementing the method as said second data packets.

8. The method according to claim 6, wherein said configuration commands comprise an address identifying said receiver.

9. A transmission quality monitoring device for non intrusive determination of a transmission quality of a first communication link between a transmitter device and a receiver device, said transmission quality monitoring device comprising:

a first network interface for reception of first data packets from the transmitter device;

a memory for storing of at least part of said first data packets as reference data packets;

a second network interface for reception of retransmitted data packets, said retransmitted data packets being at least part of said first data packets that are transmitted from the transmitter device to the receiver device via said first communication link, received by the receiver device, and retransmitted by the receiver to said transmission quality monitoring device via a second communication link between the receiver device and said transmission quality monitoring device, the second communication link being different from the first communication link of which transmission quality is to be determined;

a controller for determination of transmission quality of said first communication link between the transmitter device and the receiver device through comparison between said reference data packets and said retransmitted data packets.

10. The device according to claim 9, wherein said controller further associates time stamps to first data packets as said first data packets are received via said first network interface, and said transmission quality monitoring device comprises a memory for storing of these time stamps.

11. The device according to claim 10, wherein said determination of said transmission quality of said first communication link comprises a determination by said controller of network jitter by a comparison of time stamp between subsequent first data packets and subsequent second data packets.

\* \* \* \* \*